United States Patent [19] [11] 4,373,937
Krause et al. [45] Feb. 15, 1983

[54] ELECTROSTATIC PRECIPITATOR WITH MODULAR CABINET AND CELL WASHER

[75] Inventors: James A. Krause, Harrison, Ark.; Edward A. Kitsch, Kirkwood, Mo.

[73] Assignee: Emerson Electric Co., St. Louis, Mo.

[21] Appl. No.: 33,465

[22] Filed: Apr. 26, 1979

Related U.S. Application Data

[63] Continuation of Ser. No. 838,205, Sep. 30, 1977, abandoned.

[51] Int. Cl.³ .............................. B03C 3/78; B03C 3/82
[52] U.S. Cl. .......................................... 55/118; 55/138; 55/143; 55/145; 55/242; 55/481; 312/107; 312/111
[58] Field of Search .................... 55/118, 120, 137–138, 55/143, 145–147, 151, 154, 242, 481, 503; 312/107, 111

[56] References Cited

U.S. PATENT DOCUMENTS

| | | | |
|---|---|---|---|
| 2,233,639 | 3/1941 | Pegg | 55/118 |
| 2,323,957 | 7/1943 | Zalkind | 312/107 |
| 2,476,247 | 7/1949 | MacKenzie | 55/137 |
| 2,615,529 | 10/1952 | Lincoln | 55/118 |
| 2,900,042 | 8/1959 | Coolidge, Jr. et al. | 55/143 X |
| 2,969,038 | 1/1961 | Neumann | 55/503 X |
| 3,257,778 | 6/1966 | Flagg | 55/118 |
| 3,705,478 | 12/1972 | Vaneldik et al. | 55/503 X |
| 3,716,966 | 2/1973 | De Seversky | 55/137 X |
| 3,785,124 | 1/1974 | Gaylord | 55/118 |
| 4,023,871 | 5/1977 | Dantzler | 312/107 |
| 4,026,684 | 5/1977 | Finger | 55/138 X |

FOREIGN PATENT DOCUMENTS

550975 12/1959 Belgium .............................. 312/111

Primary Examiner—Kathleen J. Prunner
Attorney, Agent, or Firm—Charles E. Markham

[57] ABSTRACT

A roof-mounted electrostatic air cleaner for connection to an exhaust duct has a sectionalized cabinet with detachably connected, directable inlet and outlet sections and an intermediate precipitator section, a traveling manifold with multiple spray nozzles is arranged to wash the outer surfaces of precipitator cell end plates as well as both surfaces of intermediate collector plates, and a construction and arrangement of large capacity precipitator cells provides for their convenient and safe assembly and removal from the cabinet.

3 Claims, 17 Drawing Figures

ELECTROSTATIC PRECIPITATOR WITH MODULAR CABINET AND CELL WASHER

This is a continuation of application Ser. No. 838,205 filed Sept. 30, 1977 now abandoned.

This invention relates to electrostatic air cleaners and particularly to an improved construction thereof and to washing means for large capacity, cabinet-type, multi-celled cleaners.

It is essential to effective operation of electrostatic air cleaners that the cell collector plates and ionizing section be frequently and thoroughly cleaned. Arrangements including traveling manifolds carrying multiple spray nozzles have been proposed for washing the cells. To applicant's knowledge, however, no arrangement has been proposed which is capable of effectively washing the outer surfaces of the grounded cell end plates and insulators which insulate the ends of positively charged collector plate and ionizing support rods projecting through and attached to the cell end plates.

Accumulations of particulate matter on and adjacent the projecting rod ends and insulators provide a path between the ends of the positively charged rods and the grounded cell end plates, resulting in highly objectionable arcing particularly when these areas are damp. Moreover, the condition is worsened when conventional pressed fibre insulators or other insulators of relatively hygroscopic materials are employed.

It has also been found that existing ducts and other associated equipment at the site of installation may require that the outlet be directed at 90 degrees in one direction or the other to the inlet. Heretofore, to meet these various requirements, it was necessary to manufacture and stock several different models of the air cleaner.

U.S. Pat. Nos. 2,448,046, 2,591,404, 2,604,184, 2,615,529, 3,055,158, and 3,464,185 show means for washing the precipitator cells of an electrostatic air cleaner, but do not show or describe means assuring that the outer surfaces of the cell end plates and the projecting ends of ionizing and collector plate support rods connected thereto and insulated therefrom are thoroughly washed. U.S. Pat. No. 2,233,639 discloses an electrostatic air cleaner comprising a cabinet having a lower inlet section, an upper outlet section, and an intermediate precipitator section containing a plurality of precipitator cells with a front side opening for insertion or removal of the cells. These sections of cabinet are not, however, detachably connected so that the inlet and outlet sections may be rotated with respect to the intermediate section.

Accordingly, an object of the invention is to provide a generally new and improved multi-celled electrostatic air cleaner which meets the foregoing requirements and includes novel constructions of functioning elements;

A further object is to provide improved means for thoroughly washing the precipitator cells of an electrostatic air cleaner while they are in their operating positions.

A further object is to provide an electrostatic air cleaner having a sectionalized cabinet comprising a precipitator section and inlet and outlet sections which may be conveniently attached thereto, each facing in any one of four directions 90 degrees apart.

A further object is to provide a novel and improved means of supporting and insulating the ionizing wires in an electrostatic air cleaner A further object is to provide an elongated precipitator cell with intermediate means for supporting the collector plate support rods and tubes.

A further object is to provide insulators for insulating the ends of positively charged collector plates and ionizing support rods from the cell end plates through which they project, which insulators have hard smooth surfaces impervious to moisture and are shaped so as to be easily washed.

These and further objects and advantages will appear from the following description when read in connection with the accompanying drawings.

In the drawings;

FIG. 1 is a top plan view of an electrostatic air cleaner constructed in accordance with the invention;

FIG. 2 is a front elevational view of the electrostatic air cleaner of FIG. 1, shown in association with control equipment and an outlet blower;

Referring to the drawings in more detail, the electrostatic air cleaner generally indicated at 10 in FIGS. 1 and 2 comprises a sectionalized cabinet having a lower inlet section 12 with an inlet opening 11 in one side thereof with a surrounding inlet flange 13, an intermediate precipitator section 14 with an access opening 19 in one side thereof, and an upper outlet section 16 with an outlet opening 15 in one side thereof with a surrounding outlet flange 17. The cabinet is square in plan and is constructed of sheet metal, the sections 12, 14, and 16 each having four sidewalls of equal horizontal length. The upper horizontal edges of the sidewalls of lower horizontal section 12, the upper and lower edges of the sidewalls of intermediate section 14, and the lower horizontal edges of the sidewalls of upper outlet section 16 are similarly formed first horizontally to form horizontal flanges 21 and then vertically to provide locking grooves 18 extending horizontally the length of the sides of the cabinet sections. When the sections are assembled with the flanges 21 meeting, the horizontal locking grooves 18 are opposed and slidably receive a locking strip 20 having the general form of a block letter "C" in cross section, see FIGS. 3 and 4. The lower inlet section 12 and the upper outlet section 16 may, therefore, be conveniently assembled to the intermediate section 14 with their respective inlet opening 11 and outlet opening 15 facing in any one of four directions with respect to that side of the intermediate section 14 having the access opening 19 therein.

Figure 3:
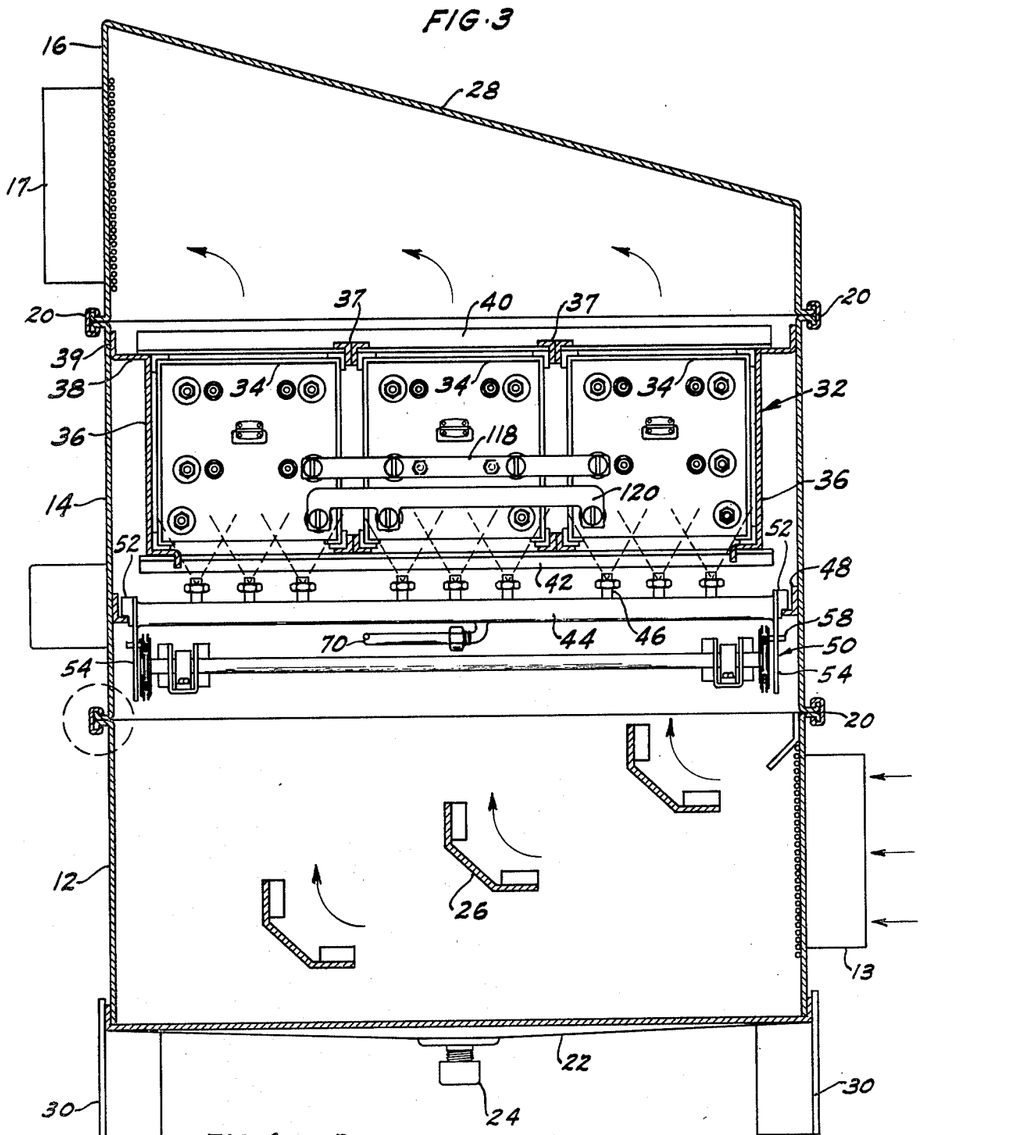
FIG. 3 is an enlarged cross-sectional elevation taken along line 3—3 of FIG. 1.
Figure 4:
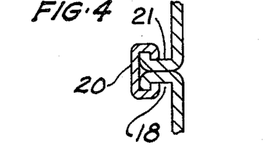
FIG. 4 is an enlarged view of the portion enclosed in the dotted circle in FIG. 3, showing the means for detachably connecting the cabinet sections.

Referring to FIG. 3, the lower section 12 has a saucer-shaped bottom 22 provided with a central drain plug 24. Lower section 12 is further provided with baffles 26 extending horizontally between two of its sidewalls, and perpendicular to inlet 11, for directing horizontally incoming air upward toward the precipitator section 14. The outlet section 16 has a sloping roof 28 to induce flow toward outlet opening 15. The cabinet 10 is provided with four legs 30 which may be adjustably attached to the lower inlet section 12 so as to accommodate any inclination or irregular surface upon which the cabinet may be mounted.

That side of the intermediate precipitator section 14 having the access opening 19 therein will be referred to hereafter as its front side. The access opening 19 is provided for the insertion or removal of precipitator cells. A pair of hinged doors 31 are provided to close the access opening. On the outside of one of the doors 31 is mounted a power pack unit 33. Cabinet section 14 is further provided with a suspended metal frame, generally indicated at 32 in FIG. 3, which slidably receives three elongated precipitator cells generally indicated at 34. The frame 32 comprises two parallel vertical sidewalls 36 extending from the front to rear of the cabinet section and spaced from the adjacent parallel cabinet sidewalls. Frame sidewalls 36 are suitably attached at their upper horizontally and vertically formed portions 38 and 39 to the adjacent parallel cabinet sidewalls. Upper and lower transverse angle members 40 and 42 are connected to the front and rear cabinet sidewalls. Upper and lower horizontally spaced T-section members 37 extending parallel to the frame sidewalls 36 and supported at their ends on angle members 40 and 42 provide together with the frame sidewalls 36 three elongated compartments or guideways for slidably receiving and retaining three elongated precipitator cells 34. The elongated precipitator cells 34, which are described hereinafter in more detail, each comprise an elongated frame including transverse end plates 76 and intermediate collector plates 100 and 102 parallel with the end plates. The cells 34 are of such length that their end plates are spaced from the front and rear cabinet walls sufficiently to insure that their end plates may be thoroughly washed. A stop strip 41, see FIG. 5, limits the insertion of the cells so that their rear end plates are sufficiently spaced from the rear cabinet wall. The frame 32 and cells 34 occupy the upper portion of cabinet section 14.

Figure 7:
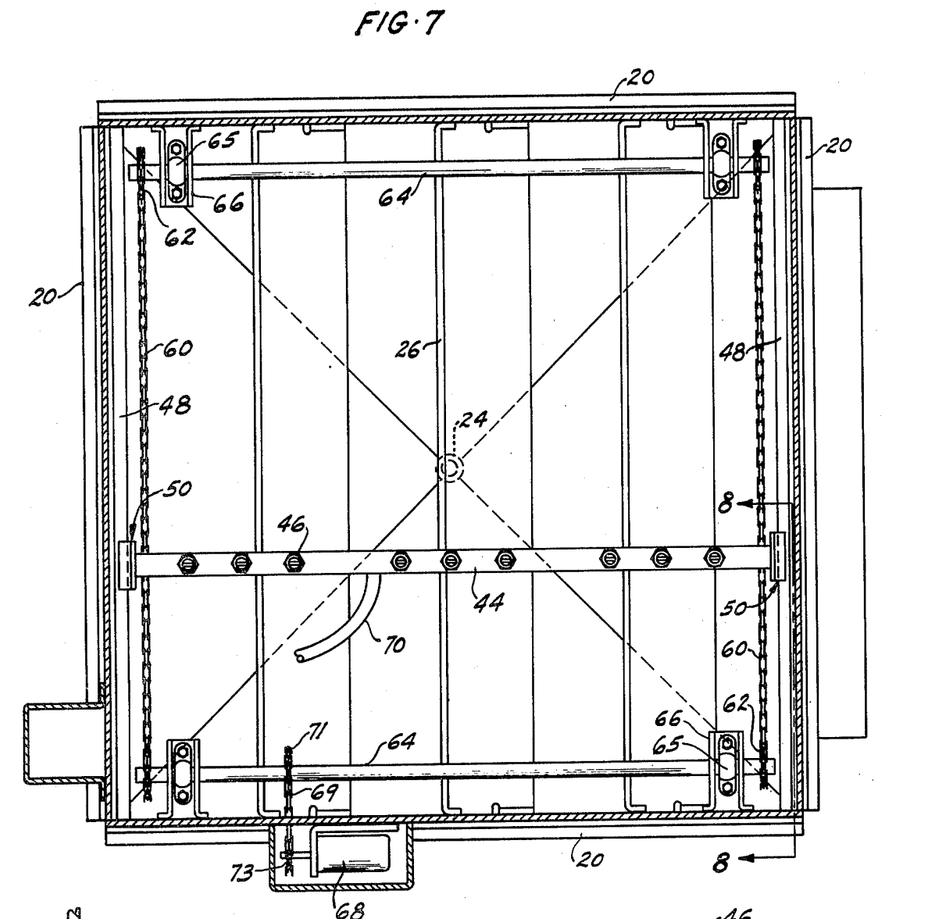
FIG. 7 is an enlarged cross-sectional plan view taken along line 7—7 of FIG. 2 showing the traveling washing manifold and drive means therefor.
Figure 8:
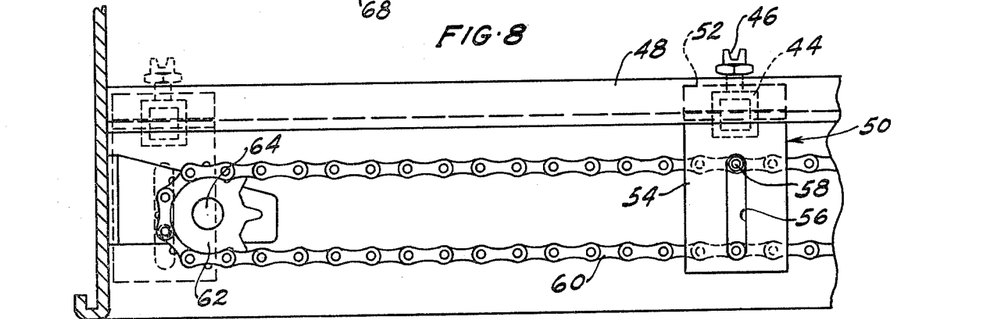
FIG. 8 is an enlarged detail view of one end of the washing manifold and sprocket and chain drive taken along line 8—8 of FIG. 7.
Figure 9:
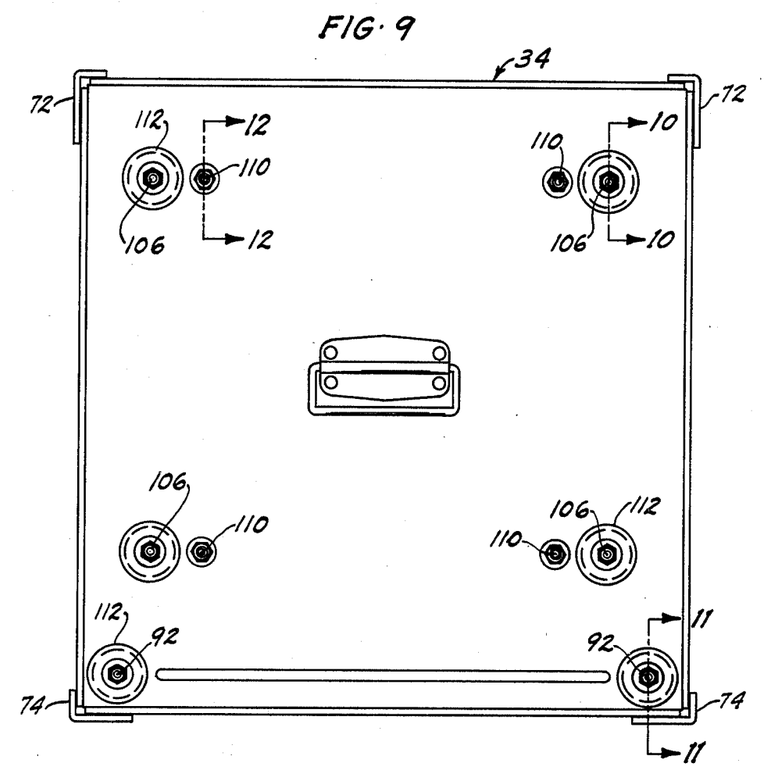
FIG. 9 is an enlarged front elevational view of one of the precipitator cells.
Figure 10:
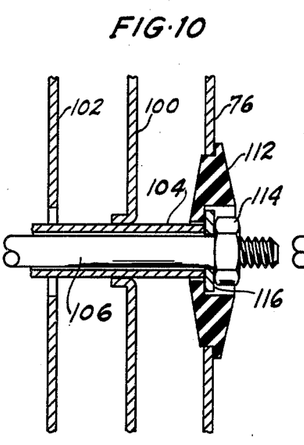
FIG. 10 is a further enlarged fragmentary detail view taken along line 10—10 of FIG. 9 showing one end of a positively charged collector plate support rod and means for insulating it from and attaching it to the cell end plate.
Figure 11:
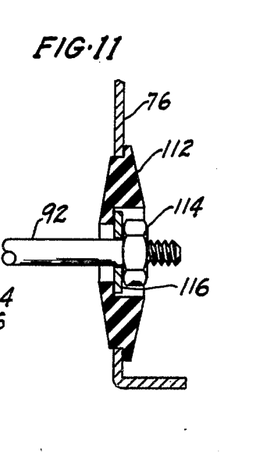
FIG. 11 is an enlarged detail view taken along line 11—11 of FIG. 9 showing one end of a positively charged ionizing support rod with means for insulating it from and attaching it to the cell end plate.
Figure 12:
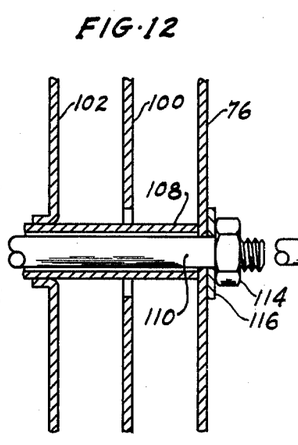
FIG. 12 is an enlarged detail view taken along line 12—12 of FIG. 9 showing one end of a negative or grounded collector plate support rod and means for electrically and mechanically connecting it to the cell end plate.

In the lower portion of intermediate cabinet section 14, there is a horizontally arranged tubular manifold 44 carrying a plurality of upwardly directed spray nozzles 46 for washing the cells 34, see FIGS. 3, 7, and 8. Manifold 44 extends between the sidewalls of cabinet section 14 parallel with the end plates and collector plates of precipitator cells 34, and is arranged to reciprocate between the front and rear walls of cabinet section 14 in a direction perpendicular to the end plates and collector plates of precipitator cells 34. A conduit, including a flexible section 70, connects manifold 44 with a source of detergent and water under pressure. Angle members 48 attached to the cabinet sidewalls and extending from the front to rear walls thereof provide a track for guiding and supporting the ends of reciprocating manifold 44. Members 50 attached to the ends of manifold 44 include an upper portion 52 slidably engaging the horizontal leg of an angle track member 48 and a downwardly extending plate portion 54 having a vertical slot 56 therein receiving a driving pin 58 carried by endless sprocket chains 60.

Each of the endless sprocket chains 60 is meshed on a pair of sprocket wheels 62 fixed on shafts 64 at the front and rear of cabinet section 14. The shafts 64 rotate in journals 65 carried by brackets 66 fixed to the front and rear walls of cabinet section 14. The shaft 64 at the front of the cabinet section is driven by an electric motor 68 through an endless sprocket chain 69 and sprocket wheels 71 and 73, attached, respectively, to the shaft 64 and the shaft of motor 68. The arrangement is such that the manifold 44 travels sufficiently beyond the front and rear end plates of precipitator cells 34 to thoroughly wash their outer surfaces. The manifold 44 with spray nozzles 46, see FIG. 3, being located below the cells 34 and parallel with the cell collector plates directs a washing spray upwardly along the surfaces of the cell plates. The spray nozzles 46 are arranged along the manifold in three groups, each group being centered with a cell 34, above, and the nozzles are constructed so as to provide an overlapping spray, as indicated in dashed line.

The precipitator cells 34, shown in FIGS. 9 to 15, are elongated and comprise a frame consisting of upper and lower longitudinal angle members 72 and 74, two rectangular end plates 76, and a perforated bottom wall 78 extending between the end plates. The four edges of end plates 76 are formed outward at 90 degrees to provide flanges which lie contiguous with and are suitably fastened to parallel flanges of upper and lower longitudinal frame angle members 72 and 74. There is also an intermediate rectangular plate 80, see FIGS. 13 and 14, having its edges similarly formed and fastened to frame angle members 72 and 74. This intermediate plate 80 provides a support for the relatively long collector plate support rods, see FIG. 17, and makes practical the construction of a single precipitator cell having the same number and spacing of collector plates in one cell as are conventionally included in two cells. The advantage of providing one cell having the capacity of two conventional length cells is construction cost and convenience of assembly or removal of the cells from the frame.

Figures 13, 14, 15, 16, 17:
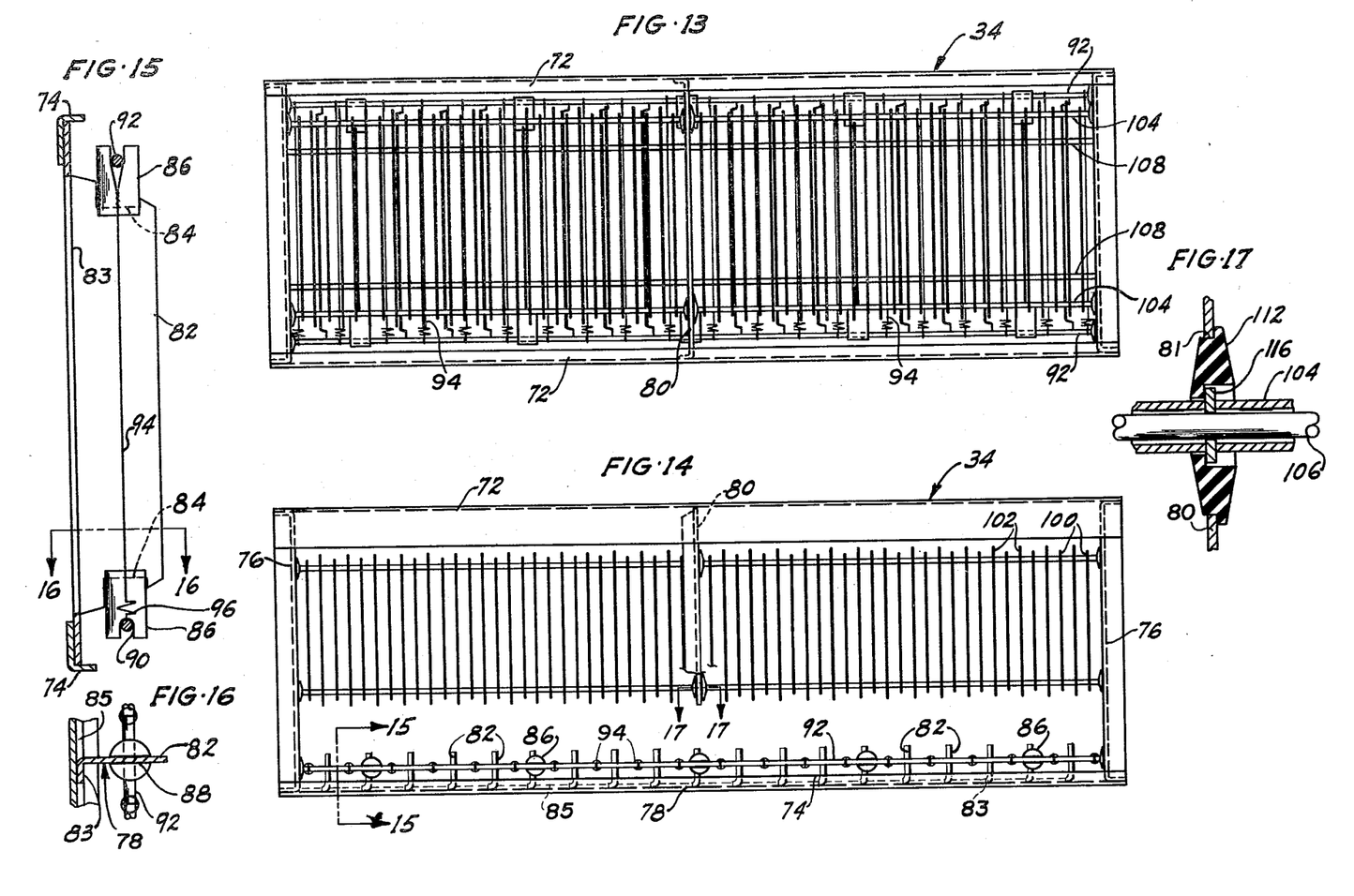
FIG. 13 is a top plan view of one of the precipitator cells.
FIG. 14 is a side elevational view of the cell shown in FIG. 13.
FIG. 15 is an enlarged cross-sectional view through the ionizing section of the cell taken along line 15—15 of FIG. 14.
FIG. 16 is a cross-sectional view taken along line 16—16 of FIG. 15.
FIG. 17 is an enlarged cross-sectional view taken along line 17—17 of FIG. 14 showing means for supporting the positively charged collector plate support rods and tubes and for insulating them from the intermediate stiffening plate.

The bottom wall 78 of the cell frame is punched and then formed to provide a series of short, upstanding, parallel plates 82 extending transversely of the cell, see FIGS. 14 to 16. The unpunched and unformed portions 83 of the bottom wall 78 are narrow relative to the punched out and upwardly formed portions 82, so that the bottom wall 78 is essentially a grill having relatively wide, transversely elongated, rectangular openings 85 spaced by relatively narrow transverse strips 83. The ends of the upstanding plates 82 are notched at 84 to receive cylindrical ceramic insulators 86. The insulators 86 are, in turn, notched at their inner ends at 88 to receive the bottom of notch 84. The ends of insulators 86 are provided with retaining grooves 90 which receive longitudinally extending ionizing wire support rods 92. A sufficient number of insulators 86 is spaced along the series of upstanding plates 82 to preclude undue flexing of support rods 92.

A series of positively charged ionizing wires 94 extending transversely of the cell 34 is provided. Each wire of the series is substantially centered between two upstanding plates 82. The wires 94 are connected at their ends to the support rods 92 and each wire includes a tensioning spring 96 in series therewith. The ceramic insulators 86 insulate the support rods 92 and ionizing wires 94 from the cell frame, and the support rods 92 and ceramic insulators 86 are held resiliently and firmly in position by the tensioning springs 96. The ionizing wires 94, which are positively charged, and upstanding plates 82, which are grounded, form the ionizing section of the cells 34.

The collector section of the cells 34 arranged above the ionizing section comprises a series of alternate, positively charged, transversely arranged collector plates 100 and negatively charged (or grounded) collector plates 102. The positive collector plates 100 are spaced along and suitably attached to metal tubes 104 having support rods 106 extending therethrough. Support rods 106 have screw-threaded ends which extend beyond end plates 76. The negative collector plates 102 are spaced along and suitably attached to metal tubes 108 having support rods 110 extending therethrough. Support rods 110 also have screw-threaded ends which extend through apertures in end plates 76 and are provided with nuts 114 and washers 116.

The positively charged collector plate support rods 106 and the positively charged ionizing wire support rods 92 have their screw-threaded ends extending through central apertures in circular disc insulators 112, which insulators are, in turn, fitted into apertures in the cell frame end plates 76. The circular disc insulators 112 are preferably constructed of a ceramic material, with glazed surfaces impervious to moisture and their opposite faces converging from a relatively thick central portion to a relatively thin perimeter, see FIGS. 10 and 11. The screw-threaded ends of rods 106 and 92 are provided with nuts 114 and washers 116.

The tubes 104 which carry the positively charged collector plates 100 are in two sections, each section extending from an end plate 76 to the center stiffening plate 80 where it abuts a washer 116 positioned in an insulator 112, which insulator, in turn, is fitted into an aperture 81 in plate 80, see FIG. 17. The positively charged collector plates 100 are provided with large clearance holes through which the tubes 108 and rods 110 carrying the negative collector plates pass, and the negatively charged plates 102 are provided with large clearance holes through which the tubes 104 and rods 106 carrying the positively charged plates 100 pass. The negative plates 102 are therefore grounded to cell frame 32 and insulated from positive plates 100, and positive plates 100 are insulated from plates 102 and from the cell frame.

Figures 5, 6:
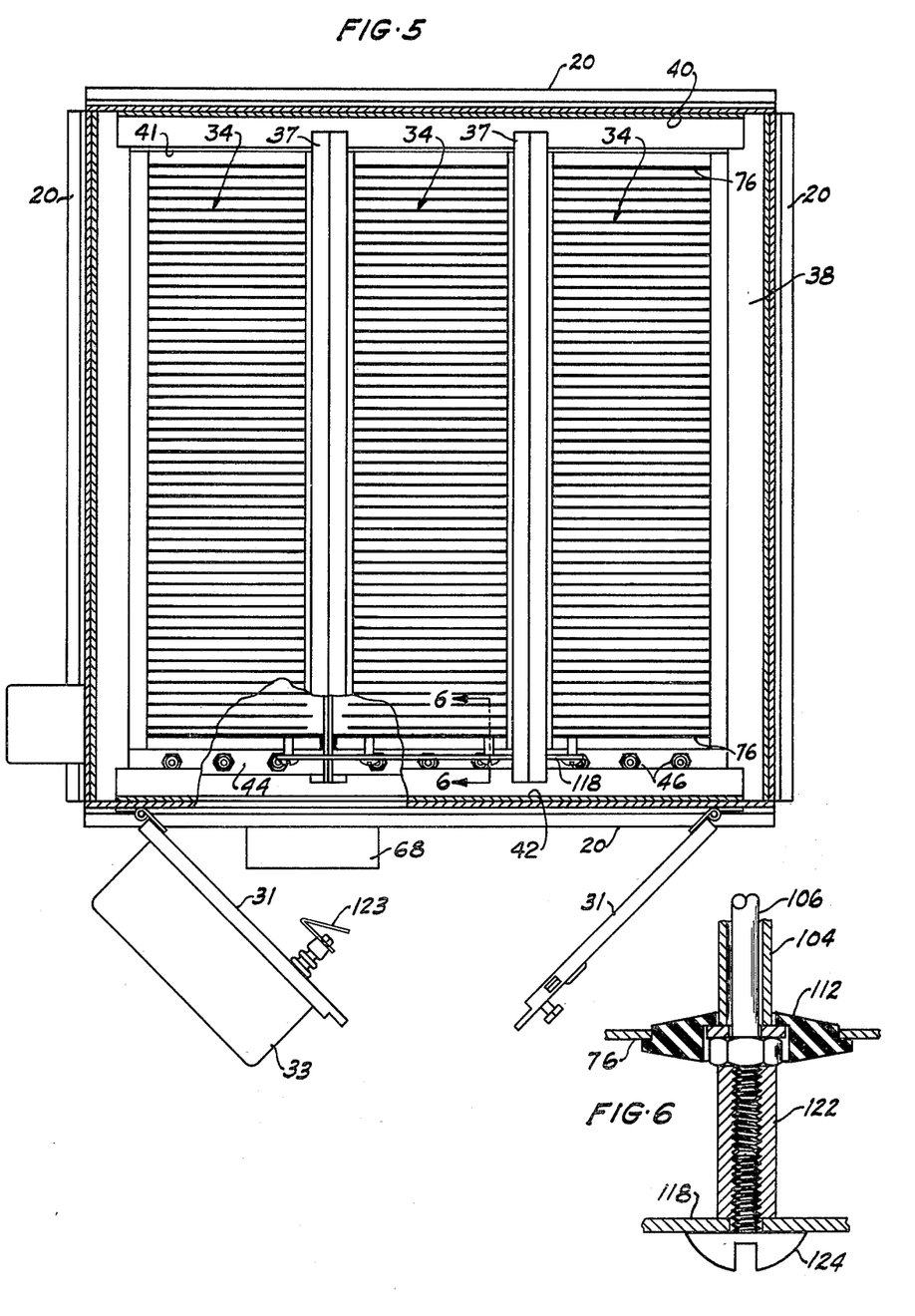
FIG. 5 is an enlarged cross-sectional plan view taken along line 5—5 of FIG. 2, showing the precipitator cell arrangement and extreme travel position of the washing manifold.
FIG. 6 is a fragmentary detail view showing the means for spacing and attaching the buss bars to the ends of the positively charged collector plate and ionizing wire support rods.

The cells 34 are provided at one end with buss bars 118 and 120 spaced forward of front end plate 76 and connected to the ends of positive plate-carrying rods 106 and to the ends of ionizing support rods 92, respectively, see FIGS. 3, 5, and 6. Internally threaded spacers 122, see FIG. 6, are threadedly engaged at one end on the screw-threaded ends of rods 106 and 92, and the buss bars 118 and 120 are attached to the other ends of spacers 122 by screws 124.

The power pack unit 33 attached to one of the doors 31 includes means (not shown) for converting a commercial a.c. power supply of 120 or 240 volts to two diverse d.c. or unidirectional high voltage output supplies in the order of 8,000 to 12,000 volts at upper and lower resilient output contactor elements 123. Lower contactor element 123 (not shown) is directly in line with and below upper contactor element 123. Conventionally, the lower contactor element 123, which engages the lower buss bar 120 connected to the ionizing wire support rods 92, carries the higher voltage. It is to be understood that the power pack may be constructed and arranged so as to provide a single high voltage output at both upper and lower contactor elements 123 to be applied to both the ionizing support rods 92 and the positive plate support rods 106. The frames and end plates of cells 34 are suitably grounded and, therefore, the negative collector plates 102 are also grounded.

ASSEMBLY AND OPERATION

Upon installation, the cabinet sections 12, 14, and 16 are assembled and locked together with locking strips 20, with the inlet 11 of section 12 in position for connecting to an existing exhaust duct and with the outlet 15 of section 16 facing in a desired direction for connection to a blower 19. The front side of intermediate section 14 may also be connected to the sections 12 and 16 so as to be facing in a direction for convenient connection to preferably positioned supply and control devices, such as a water pump 126, detergent supply tank 128, and electrical power supply and control panel 130, indicated in FIG. 2. Inasmuch as the cabinet of large capacity, multi-celled, electronic air cleaners is quite large, forming it in three conveniently assembled sections also provides convenience in transportation to the site of installation.

When the cabinet is assembled and connected to a suitable electrical power supply and to suitable washing liquid supply means, the three cells 34 are slidably entered into the three compartments of frame 32 and the buss bars 118 and 120 are attached, respectively, to the ends of collector plate and ionizing wire support rods 106 and 92. Closure of the door 31 connects the buss bars 118 and 120 to the high voltage generating power pack 33 via the resilient contactors 123. An ionizing field now exists between the positively charged wires 94 and negative upstanding plates 82 on either side thereof to effect ionization of particulate matter in an air stream entering inlet 11 and passing upward through the grid-like bottom wall 78 of cells 34. After passing the ionizing section, ionized particles are collected on the alternately arranged positive and negative collector plates 100 and 102.

When it is desired to wash the collector plates 100 and 102, both sides of end plates 76 and the insulators 112, water and/or detergent is supplied under pressure to manifold 44 and the electric motor 68 is energized to reciprocate the manifold. Spray issuing from spray nozzles 46 is directed upward through the grid-like bottom wall 78, washing the upstanding plates 82 and ionizing wires 94 and thence upward between the collector plates 100 and 102. Manifold 44 moves beyond the outer surfaces of both front and rear cell end plates 76 when in its extreme positions, see FIG. 5, so that the outer surfaces of these end plates and the outer surfaces of insulators 112 are thoroughly washed.

Suitable automatic means (not shown) is incorporated in the control panel 130 for timing the wash cycles, for indicating deletion of supply, or malfunctioning of the device.

We claim:

1. An electrostatic air cleaner comprising a cabinet having three vertically arranged and detachably connected sections, said sections being square in plan with four sidewalls of equal horizontal length, the upper of said sections having a top wall and an outlet opening in one sidewall thereof, the lower of said sections having a bottom wall and an inlet opening in one sidewall thereof, and the intermediate of said sections having an access opening in one sidewall thereof provided with at least one door for closing said opening, and said inlet and outlet openings being surrounded by flanges, means in said intermediate cabinet section slidably receiving a plurality of electrostatic precipitator cells which cells are enterable and removable through said access opening, the horizontal meeting edges of said cabinet section sidewalls being formed horizontally to provide meeting flanges, and means detachably connecting said meeting flanges whereby said lower inlet section and said upper outlet section may be assembled to said intermediate section with their respective inlet and outlet openings facing in any one of four directions with respect to said access opening in said intermediate section.

2. The electrostatic air cleaner claimed in claim 1 in which said electrostatic precipitator cells are of elongated rectangular shape and are arranged horizontally side by side in the upper portion of said intermediate cabinet section, each of said cells including a collector section comprising a plurality of transversely extending and vertically arranged collector plates and an ionizing section comprising a plurality of transversely extending ionizing wires arranged below said collector section, and which includes means for washing said cells comprising an elongated horizontal manifold in said intermediate cabinet section positioned below said cells, said manifold being arranged parallel with said collector plates and including a plurality of spray nozzles spaced therealong for directing a liquid spray upward through said cells, and means causing said manifold to reciprocate from one end to the other of said cells in a direction perpendicular to said collector plates.

3. The electrostatic air cleaner claimed in claim 2 in which said precipitator cells each include a pair of end plates parallel with said collector plates and a plurality of support rods for said collector plates extending through and attached at their ends to said end plates, in which said cell end plates are spaced from the adjacent sidewalls of said intermediate cabinet section, and in which said elongated manifold is caused to travel substantially beyond said end plates at both extremes of its travel whereby spray from said spray nozzles washes the outer surfaces of said end plates and the projecting ends of said support rods.

* * * * *